F. SAMUELSON.

GOVERNING MECHANISM FOR MIXED PRESSURE TURBINES.

APPLICATION FILED FEB. 16, 1911.

Reissued Apr. 18, 1911. 13,229.

2 SHEETS—SHEET 1.

Witnesses

Marcus L. Byng.

J. Ellis Glen.

Inventor,

Frederick Samuelson, by Albert G. Davis

Att'y.

F. SAMUELSON.

GOVERNING MECHANISM FOR MIXED PRESSURE TURBINES.

APPLICATION FILED FEB. 16, 1911.

Reissued Apr. 18, 1911. 13,229.

2 SHEETS—SHEET 2.

Witnesses:

Marcus L. Byng.

J. Ellis Ele[illegible]

Inventor,

Frederick Samuelson, by Albert G. Davis

Att'y.

UNITED STATES PATENT OFFICE.

FREDERICK SAMUELSON, OF RUGBY, ENGLAND, ASSIGNOR TO GENERAL ELECTRIC COMPANY, A CORPORATION OF NEW YORK.

GOVERNING MECHANISM FOR MIXED-PRESSURE TURBINES.

13,229. Specification of Reissued Letters Patent. Reissued Apr. 18, 1911.

Original No. 973,705, dated October 25, 1910, Serial No. 549,747. Application for reissue filed February 16, 1911. Serial No. 609,072.

*To all whom it may concern:*

Be it known that I, FREDERICK SAMUELSON, a subject of the King of Sweden, residing at Rugby, England, have invented certain new and useful Improvements in Governing Mechanisms for Mixed-Pressure Turbines, of which the following is a specification.

The present invention relates to governing mechanisms for mixed-pressure turbines, and has for its object to improve their construction whereby they are rendered more certain and reliable in operation, both under normal and emergency conditions.

For a consideration of what I consider to be novel and my invention, attention is directed to the accompanying description and the claims appended thereto.

Figure 1:
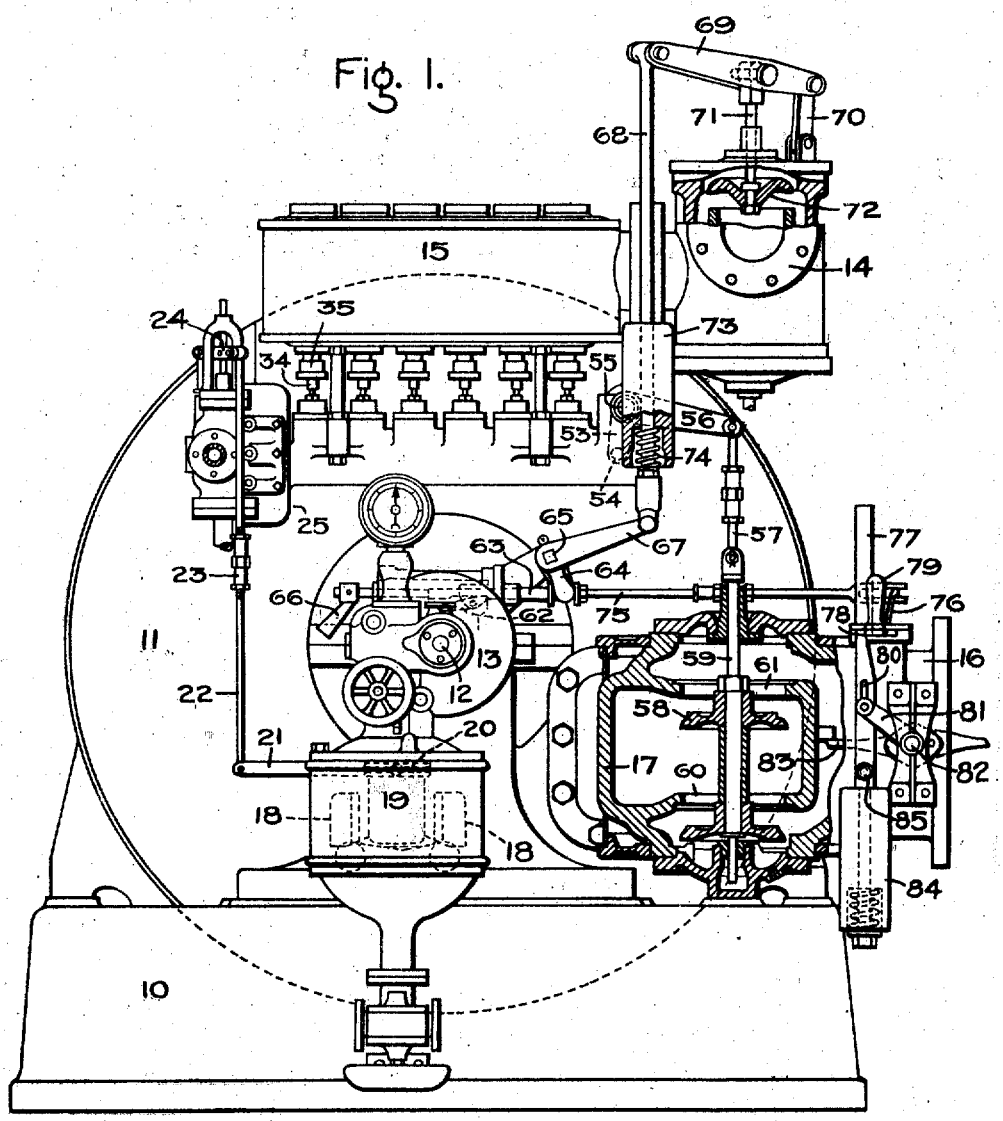
Figure 2:
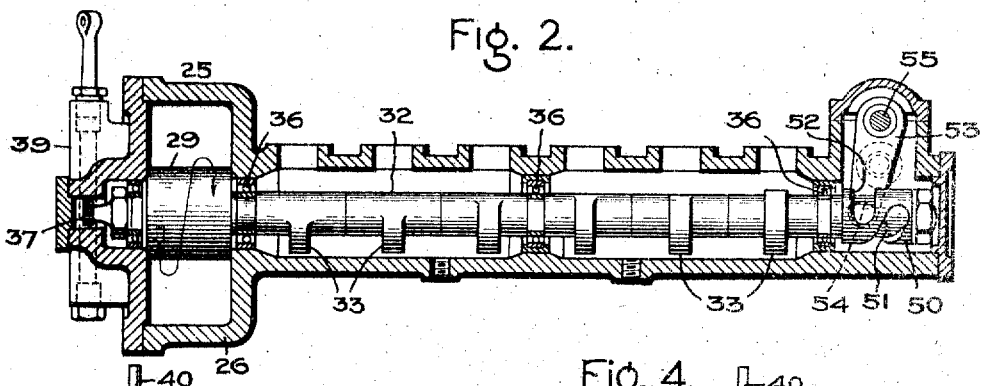
Figure 3:
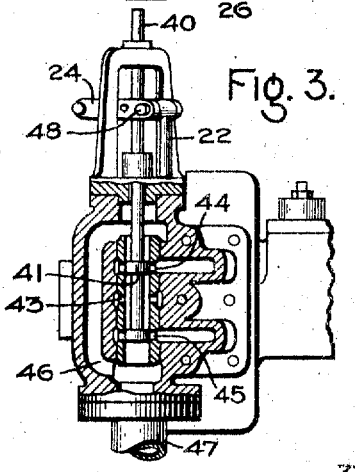
Figure 4:
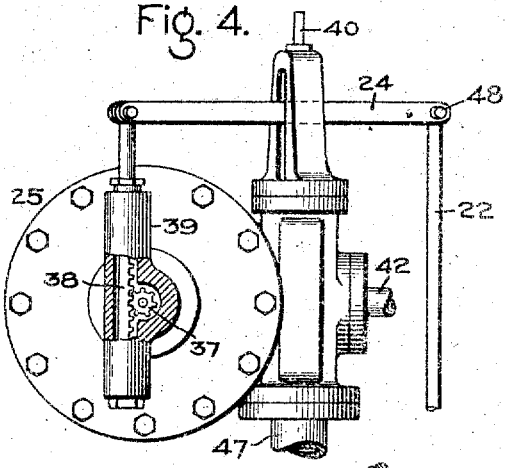
Figure 5:
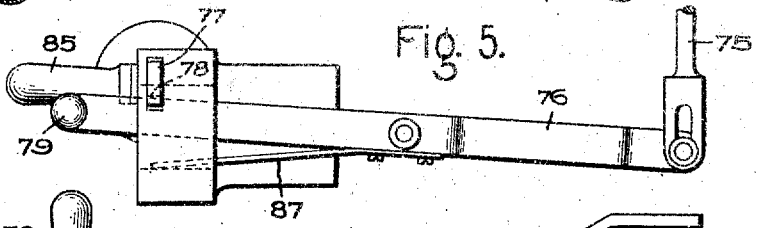
Figure 6:
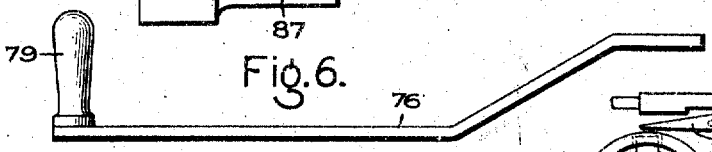
Figure 7:
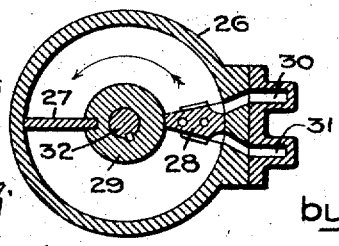
Figure 8:
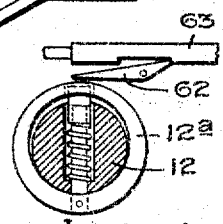

In the accompanying drawings, which illustrate one of the embodiments of my invention, Figure 1 is an end view of a turbine showing certain of the valve parts in section; Fig. 2 is a view showing the motor and the cam shaft for actuating the high-pressure nozzle valves; Fig. 3 is a detailed view showing the pilot valve for controlling the admission of motive fluid to the motor that actuates the cam shaft; Fig. 4 is a detailed view showing a part of the follow-up device; Figs. 5 and 6 are detailed views of the locking lever of the butterfly valve; Fig. 7 is a cross-section of the motor that actuates the cam shaft; and Fig. 8 is a detailed view of the emergency governor.

10 indicates the base of the machine. Mounted thereon is a turbine casing 11, which contains as many rows of wheel buckets or vanes and as many nozzles or fluid discharging devices as are necessary to extract the energy from the steam or other elastic fluid. The buckets are mounted on a suitable shaft, the reduced end of which is indicated at 12. This shaft is mounted in bearings 13, only one of which is shown on account of the character of the figures of the drawings.

Steam is admitted to the turbine from two independent sources of the fluid supply. High-pressure steam is admitted by the conduit 14 to the high-pressure valve chest 15. Low-pressure steam is admitted to the turbine by the conduit 16 that communicates with the low-pressure valve chest 17. Steam for the high-pressure service may be received from a boiler or other suitable source, and the steam for low-pressure service may be received from the exhaust of a reciprocating engine or from an accumulator, or any other suitable source. As arranged, the high-pressure steam passes through nozzles or directing devices that are separate from the nozzles or directing devices through which the low-pressure steam passes. Owing to the indifference in the volume of the high and low-pressure steam, the nozzles for the latter must have a greater cross-sectional area in order to convey it.

One speed governor is employed for controlling the admission of steam from both the high and low-pressure sources. By reason of this arrangement the apparatus is simplified and the proper sequence of operation of the various valves can be insured. This governor, which may be of any suitable type, comprises in the present instance, weights 18 that move outwardly away from the vertical secondary shaft as the speed of the apparatus increases, and toward the shaft as the speed decreases.

19 indicates a sleeve that carries the weights and is mounted upon the vertical secondary shaft that is driven through suitable gearing by the main shaft 12 of the turbine. I have not illustrated the details of the secondary shaft and the speed-reducing and power-transmitting connection between it and the main shaft for the reason that it seems unnecessary to a proper understanding of my invention.

The speed governor is provided with a collar 20 that moves up and down as the weights move in and out. This collar actuates the governor lever 21 that is pivoted to a suitable support. To the opposite end of the lever is connected a rod 22 which contains the adjustable coupling 23 whereby the length of the rod can be adjusted. The upper end of the rod is connected to the lever 24 that actuates the pilot valve. The latter is more particularly shown in Fig. 3. This pilot valve controls the admission of motive fluid (which may be a liquid or elastic fluid under pressure) to the motor 25. The motor illustrated is of the oscillating type and is more particularly shown in Fig. 7, wherein 26 is the cylinder, 27 the piston, and 28 the fixed abutment that engages the hub 29 of the piston. Fluid is admitted and exhausted through ports 30 and 31, as will appear later. The piston of the motor is keyed to the cam shaft 32, the latter being best shown in Fig. 2. Formed directly on the shaft or secured thereon is a plurality of cams 33 which are adapted to actuate the high-pressure nozzle valves by means of the stems 34, Fig. 1. For the purposes of description, these cams may be termed the main cams. The stems 34 are suitably packed at 35 to prevent the escape of steam. The cam shaft is supported in ball bearings 36 at its ends and also at intermediate points.

Mounted on the left-hand end of the cam shaft is a pinion 37 that meshes with a rack 38, the latter being suitably guided in its movements by the walls of the casing 39. The upper end of the rack is pivotally connected to the lever 24. This lever is connected by a pin with the stem 40 of the balanced pilot valve 41. Fluid under pressure is admitted by the pipe 42 to the ports 43 situated between the heads of the pilot valve. The heads of the valve normally cover the ports 44 and 45 which communicate with the ports 30 and 31 of the motor, Fig. 7. Assume that the governor, due to a decrease in speed of the turbine moves the pilot valve upward. This results in opening the port 44 and admitting pressure fluid thereto and to the port 30 Fig. 7, and to the upper side of the piston 27. The piston then moves in the direction indicated by the arrow. The same movement of the pilot valve opens the port 45 and the fluid contained in the motor cylinder under the piston is free to escape through port 31 and port 45 into the passage 46, the latter being in constant communication with the exhaust pipe 47. The passage 46 also serves to convey the exhaust fluid from the port 44 when the pilot valve is moved downwardly and the direction of movement of the piston 27 is opposite to that indicated by the arrow.

Referring again to the movement of the pilot valve first referred to, *i. e.*, moving upward to expose the port 44 to the pressure fluid, the cam shaft starts into operation and in so doing, turns the pinion 37. This movement is communicated to the rack 38 which under the conditions described moves downwardly. Since the governor has moved the rod 22 to a position corresponding to the speed of the turbine, the pivot 48, Fig. 4, now becomes the fulcrum and the pinion 37 moves the left-hand end of the lever 24 downwardly by an amount sufficient to restore the pilot valve to its normal position covering the ports 44 and 35. This movement of the cam shaft will open one or more of the nozzle valves to a greater or less extent, depending upon the load thrown on the turbine. Conversely, if the load decreases and the speed of the turbine increases, the pilot valve moves in the opposite direction to decrease the number of open nozzle valves and the pinion 37 moves in the opposite direction to restore the pilot valve 41 to its normal position, where it closes the ports leading to the motor.

The mechanism for controlling the admission of low-pressure steam from an engine, accumulator, or other sources will now be described:—Mounted on the right-hand end of the cam shaft 32 and located within the housing is a valve actuating device, such for example as a cam 50 that has a cam groove 51, a portion of which is arranged in the form of a spiral and another portion 52 arranged in a plane perpendicular to the axis of the cam shaft. For the purpose of this description the cam 50 may be termed the auxiliary cam. The reason for this peculiar arrangment is that for certain speed changes the low-pressure valve only should move away from its seat until the maximum valve opening is reached and thereafter said low-pressure valve should be held stationary or wide-open, while the cam shaft continues its movement to open the high-pressure nozzle valves one after the other to admit high-pressure steam, the latter being necessary when the supply of low-pressure steam is inadequate. In order to transmit the movements of the spiral cam to the low-pressure valve, an arm 53, Fig. 2, is provided, having at its lower end a pin or roller 54 that makes a snug fit with the walls of the groove of the spiral cam. The upper end of the arm is mounted on a rock-shaft 55. To this rock-shaft is also attached an arm 56, Fig. 1, said arms 53 and 56 forming a bell-crank lever. The outer end of the arm 56 is connected by an adjustable connecting rod 57 with the balanced, low-pressure, double-seated valve 58, the latter being mounted upon the stem 59. The stem is provided with a long bearing surface to prevent the entrance of air or the escape of steam. The valve is provided with seats 60 and 61 that are engaged by the upper and lower heads of the valve. As the speed of the turbine changes, due to changes in the load, the valve 58 rises and falls in accordance with the amplitude of the changes of the speed and load, thereby throttling the low-pressure steam from the conduit 16 to a greater or less extent. The arrangement of the parts is such that so long as the supply of low-pressure fluid is sufficient to drive the turbine at the desired speed, the high-pressure valves remain closed; but just as soon as the load increases above that value and the supply of low-pressure steam is no longer sufficient to satisfy the requirements, the high-pressure valves begin to open one after another until a balance is effected between the load requirements and the admission of high and low-pressure steam. The valves close in reverse order when part or all of the high-pressure steam supply is no longer required.

In a governing mechanism of this kind, it is essential to provide means for shutting down the turbine when for any reason its speed exceeds a predetermined value—for example, 10% above the normal. It is important the both the high and low-pressure supplies be cut off simultaneously, to prevent racing or injury to the turbine and the mechanism driven thereby. To this end, I control both the high and low-pressure sources of supply by means of a single emergency governor 12ᵃ, Fig. 8, that is mounted on or driven by the main shaft 12 of the turbine. This governor is arranged to act on the latch or trigger 62, Fig. 1, which latch engages a shoulder on the rod 63. The right-hand end of the rod is in engagement with the outer end of a forked arm 64 that is mounted on a rock-shaft 65, the latter being supported by a bracket from the main bearing of the turbine. On the left-hand end of rod 63 is a handle 66, so that it can be rotated by hand to free the shoulder from engagement with the latch 62 when desired. On the rock-shaft 65 is also mounted an arm 67 which is connected by a vertical rod 68 with the valve lever 69. The said arms 64 and 67 and shaft 65 form a bell-crank lever. The right-hand end of the valve lever 69 is supported by a link 70, and attached to said lever is the stem 71 of the high-pressure emergency valve 72. Between the lever 69 and the spindle 71 there is a certain amount of lost motion, so that a hammer blow will be imparted to the valve for the purpose of starting it quickly in the closing direction. Mounted on the vertical rod 68 is an emergency motor, in this case a weight 73, that tends at all times to close the emergency valve, which tendency is resisted by the latch 62. In order to decrease the effects of the shock due to the falling weight 73 when the latch 62 is released, a compression spring 74 is provided that rests at one end on a shoulder on the rod 68 and at the other end engages the wall of a recess in the weight. This weight is intended to be reset by hand, *i. e.*, by raising the rod 68 and weight 73; turning the arm 67, rock-shaft 65 and arm 64; and moving the rod 63 to a position where the latch 62 will engage the shoulder of the rod. The rod 63 is normally moved to the right by a spring.

The low-pressure emergency mechanism will now be described: Mounted on the rock-shaft 65 is an arm, located directly back of the arm 64, which is pinned or otherwise connected to a horizontal rod 75. The outer end of this rod is slotted to receive the locking lever 76 that normally supports the swinging and sliding bar 77 by engaging a notch or shoulder 78 therein. A handle 79 is provided on the lever, whereby the latter may be actuated by hand if desired. In the sliding and swinging bar is a slot 80 to receive a pin carried by the arm 81, the latter being rigidly secured to the spindle 82 of the butterfly valve 83. On the lower end of the bar 77 is an emergency weight 84 which normally tends to close the valve and is prevented from so doing by the locking lever 76. The bar 77 is made in two parts, an upper and lower, which are connected by the pivot 85 that also forms a handle, Fig. 5. The weight 84 is spring-supported in the same manner and for the same reason as the weight 73. Owing to the fact that there is a pin and slot connection between the sliding and swinging bar 77 and the arm 81, when the weight 84 is released, it will impart a hammer blow to the butterfly valve and cause the same to start from its position of rest and close promptly.

In Figs. 5 and 6, the details of the locking lever 76 are more clearly illustrated. The lever 76 is connected at its right-hand end by a pin and slot with the rod 75 to form a lost-motion connection. The reason for providing the slot is to permit of resetting the bar 77 by the handle 85, and also the valve 83, without being obliged to actuate the rod 75 or any of the parts beyond it. In other words, the weight 73 is reset by one operation, the weight 84 by another operation, which operations are independent, so that one weight is to be moved at a time. Said pin and slot connection also insures a hammer blow for quickly starting the parts into operation. The locking lever 76 is normally held in the position shown in Fig. 5, by the spring 87 that is located within the slot in which the left-hand end of the lever moves.

In the event of an emergency condition, and assuming that the emergency governor releases the latch 62, the weight 73 in falling closes the high-pressure valve and also moves the rod 75, which in turn moves the locking lever 76 in the direction to release the emergency weight 84 that actuates the butterfly valve 83.

It is to be noted that whereas independent weights or motors are provided for each of the valves, the weight 84 is under the direct control of the weight 73, and that both weights are controlled by the same emergency governor. In order to restore the parts to normal position after the emergency operation, the butterfly valve is first restored by raising the weight 84 and permitting the locking lever 76 to snap into place. Then the high-pressure emergency valve is restored by raising the weight 73 and permitting the latch 62 to engage the shoulder in the rod 63. I prefer to restore first the low-pressure valve and then the high, but under certain conditions this order may be reversed.

By reason of the improved construction set forth, I am able to provide a governing mechanism which is exceedingly simple and reliable in operation. The parts are very compact and relatively small. Each part is so located that it is entirely accessible and one part can be adjusted or removed without disturbing the whole mechanism. I am also able to avoid lost-motion in those parts where it would be an undesirable factor. The joints between the parts are of the simplest character and the bearing surfaces ample to prevent excessive wear or strain.

By arranging the weights 73 and 84 as described, I obtain the great advantage that the governor latch 62 only has to support one of them. When the weight 73 is released it not only closes its own valve but supplies the necessary force to trip the locking device of the second weight 84. This insures prompt action of both emergency valves with a relatively small load on the emergency governor, so that the latter will operate with certainty at exactly the predetermined tripping speed.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is—

1. In a mixed-pressure turbine, the combination of a conduit for supplying the turbine with steam from a suitable source at low pressure, a valve for regulating the flow through said conduit into the turbine, a conduit for supplying the turbine with steam from a source at relatively high pressure, a valve for regulating the flow through said high-pressure conduit into the turbine, a rotatable shaft, means actuated by the shaft for operating the high-pressure valve, a device actuated by said shaft for operating the low-pressure valve, a motor for actuating the shaft, and a speed-responsive device for controlling the motor to open the low-pressure valve to its full flow capacity before opening the high-pressure valve and to close said valves in the reverse order.

2. In a mixed-pressure turbine, the combination of a conduit for supplying the turbine with steam from a source at low pressure, a valve for regulating the flow from said conduit into the turbine, a conduit for supplying the turbine with steam from a source at relatively high pressure, a plurality of valves for regulating the flow from said high-pressure conduit into the turbine, a shaft, cams on the shaft for opening and closing the high-pressure valves in successive order, means mounted on the shaft for operating the low-pressure valve which opens said valve to its full flow capacity before said cams begin to open the first valve of said series, a hydraulic motor for actuating the shaft, a speed-responsive device for controlling the motor, and a follow-up device for preventing over-travel of the motor.

3. A turbine having high and low-pressure supply conduits, a plurality of high-pressure valves, a low-pressure valve, said valves acting on the supplies from the conduits, main cams for actuating the high-pressure valves successively, an auxiliary cam which precedes the main cams in its operation under conditions of increasing load on the turbine, a shaft for the cams, a power-transmitting connection between the auxiliary cam and low-pressure valve, a motor for driving the cam shaft, and a speed governor for controlling the motor.

4. A turbine having high and low-pressure supply conduits, high and low-pressure valves regulating the supply of fluid from the conduits to the turbine, cams for actuating the valves, said cams being so timed or arranged that the one actuating the low-pressure valve completes its work before the cam or cams actuating the high-pressure valve or valves start into operation under conditions of increasing load and reassumes its work after the high-pressure valves are closed, a motor that is common to and drives all of the cams, and a governor-controlled means for regulating the action of the motor.

5. A turbine having a conduit for supplying high-pressure motive fluid and a conduit for supplying low-pressure motive fluid, in combination with valves for regulating the admission of high-pressure fluid to the turbine, a cam shaft for moving the valves, a motor mounted on one end of the shaft for actuating it, a low-pressure valve mechanism, a lever and rod for transmitting motion from the cam shaft to the low-pressure valve mechanism, and a governor for the motor.

6. A turbine having a conduit for supplying high-pressure motive fluid and a conduit for supplying low-pressure motive fluid, in combination with valve means for regulating the admission of high-pressure fluid to the turbine, a cam shaft for actuating said valve means, a motor mounted on the shaft for actuating it directly, a low-pressure valve mechanism, a spiral cam driven by the cam shaft, a lever and rod actuated by the spiral cam for moving the low-pressure valve mechanism, and a governor for the motor.

7. A turbine having high and low-pressure supply conduits, a valve for regulating each of said supplies, a shaft, a spiral cam thereon, a motor mounted directly on the shaft for moving it, a governor for controlling the motor, and a lever actuated by the cam that is connected to the low-pressure valve.

8. In combination, a mixed-pressure turbine, conduits admitting fluid thereto from different sources, a valve in each conduit, devices for closing the valves, and a means common to the valves for controlling said devices to effect the closing of the valves under certain conditions.

9. In combination, a mixed-pressure turbine, conduits admitting fluid thereto from different sources, a quick-closing valve in each conduit, means for holding the valves open under normal conditions, and a speed governor that is common to the valves and actuates said means to effect the simultaneous closing of said valves when the speed exceeds a predetermined limit.

10. In combination, a mixed-pressure turbine, conduits admitting fluid thereto from different sources, a valve in each conduit, a tripping device common to the valves, a trigger controlling said device, and a speed governor for actuating the trigger.

11. In combination, a turbine, conduits admitting motive fluid thereto at different points, a valve in each of the conduits, a means for holding each valve open, and a single trigger for controlling all of said means.

12. A turbine having high and low-pressure supply conduits, high and low-pressure emergency valves therefor, a motor for actuating the high-pressure valve, and a locking device for the low-pressure valve that is moved by the motor that actuates said high-pressure valve.

13. A turbine having high and low-pressure supply conduits, high and low-pressure emergency valves therefor, a motor for actuating the high-pressure valve, a motor for actuating the low-pressure valve, a lock restraining the low-pressure valve from operating, a power-transmitting agent between the motor that operates the high-pressure valve and the lock, and a lost-motion device in said agent.

14. A turbine having high and low-pressure supply conduits, high and low-pressure regulating valves, means for actuating them, high and low-pressure emergency valves, means for actuating them, and a single emergency governor that controls the closing of both emergency valves.

15. A turbine having high and low-pressure supply conduits, high and low-pressure regulating valves, means for actuating them, high and low pressure emergency valves, a motor for closing each emergency valve, an emergency governor, and means actuated by the governor for bringing both of said motors into action.

16. A turbine having high and low-pressure supply conduits, high and low-pressure regulating valves, means for actuating them, high and low-pressure emergency valves, a motor for each emergency valve for closing it, an emergency governor, means actuated by the governor for releasing one of said motors, and a device actuated by one motor for releasing the other.

17. A turbine having high and low-pressure supply conduits, high and low-pressure regulating valves, high and low-pressure emergency valves, motors for actuating them that tend at all times to move the valves, a latch that prevents the motors from operating, and a governor for releasing the latch which is responsive to an abnormal condition of operation.

18. A turbine having high and low-pressure supply conduits, high and low-pressure regulating valves, high and low-pressure emergency valves, motors for actuating them that tend at all times to move the valves, a governor-controlled latch that prevents one of the motors from operating, a governor for releasing said latch which is responsive to an abnormal condition of operation, and a lost-motion device operated by the first motor for releasing the second.

19. A turbine having high and low-pressure supply conduits, high and low-pressure regulating valves, high and low-pressure emergency valves, means for holding the high-pressure emergency valve in its open position, motors for closing the emergency valves, locking means for the motors, and a governor for actuating said locking means.

20. A turbine having high and low-pressure supply conduits, high and low-pressure regulating valves, high and low pressure emergency valves, a means for holding the high-pressure emergency valve in its open position, a means for holding the low-pressure emergency valve in its open position, motors that tend at all times to close the emergency valves, a locking device for the motors, and a governor for actuating said device.

21. A turbine having a conduit for supplying high-pressure motive fluid and a conduit for supplying low-pressure motive fluid, in combination with a valve means for regulating the admission of high-pressure fluid to the turbine, valve means for regulating the admission of low-pressure fluid to the turbine, a motor for actuating both of said valve means, a speed governor that controls said valve means and is driven by the turbine, emergency valves independent in action of said regulating valves, independent motors for operating the emergency valves, latches for preventing both motors from operating, and a speed governor, also driven by the turbine, that trips one latch, the other being tripped by one of the motors.

22. A turbine having a conduit for supplying high-pressure motive fluid and a conduit for supplying low-pressure motive fluid, in combination with valves for regulating the admission of high-pressure fluid to the turbine, a cam shaft for moving the valves, a motor mounted on one end of the shaft for actuating it, a low-pressure valve mechanism, a bell-crank lever and rod for transmitting motion from the cam shaft to the low-pressure valve mechanism, emergency valves for the high and low-pressure sources that are arranged to close independently of the regulating valves, and an emergency governor that controls the emergency valves.

23. A turbine having a conduit for supplying high-pressure motive fluid and a conduit for supplying low-pressure motive fluid, in combination with valve means for regulating the admission of high-pressure fluid to the turbine, a cam shaft for actuating the valves, a motor mounted on the shaft for actuating it directly, a low-pressure valve mechanism, a spiral cam driven by the cam shaft, a lever and rod actuated by the spiral cam for moving the low-pressure valve mechanism, a governor for the motor, a butterfly emergency valve, a sliding and swinging rod, a weight on the rod for closing the valve, and means for releasing the rod and weight.

24. A turbine having high and low-pressure supply conduits, a valve for each of the said supplies, a shaft, a spiral cam thereon, a motor mounted directly on the shaft for moving it, a governor for controlling the motor, means actuated by the cam that is connected to the low-pressure valve, an emergency low-pressure valve acting independently of the regulating valve, a means for imparting a hammer blow to said valve to close it suddenly, a restraining latch for said means, and a governor controlled motor for releasing said latch.

25. A turbine having high and low-pressure supply conduits, a plurality of high-pressure valves, a low-pressure valve, said valves acting on the supplies from the conduits, main cams for actuating the high-pressure valves successively, an auxiliary cam which precedes the main cam in its operation under conditions of increasing load on the turbine, a shaft for the cams, a power-transmitting connection between the auxiliary cam and the low-pressure valve, a motor mounted directly on the shaft that drives all of the cams, a speed governor for controlling the motor, a low-pressure emergency valve, a sliding rod for actuating it, a locking lever therefor, means tending to hold the locking lever in engagement with the rod, and means for moving the lever against the action of the spring.

26. A turbine having high and low-pressure supply conduits, high and low-pressure valves regulating the supply of fluid from the conduits to the turbines, cams for actuating the valves, said cams being so timed or arranged that the one actuating the low-pressure valve completes its work before the cam or cams actuating the high-pressure valve or valves start into operation under conditions of increasing load, and reassumes its work after the high-pressure valve or valves are closed, a motor that is common to and drives all of the cams, a governor-controlled means for regulating the action of the motor, high and low-pressure emergency valves, a closing weight for each valve, means actuated by one weight for releasing the other, and a governor for controlling the action of said weights.

27. In a governor mechanism, the combination of a motor, a shaft driven thereby, a pilot valve for controlling the movements of the motor piston, a governor, a lever that is attached to the pilot valve and is moved by the governor, and a follow-up device for the pilot valve comprising a pinion driven by the motor, and a rack meshing therewith which is attached to the lever and under certain conditions holds one end of the lever stationary and at other times moves it.

In witness whereof, I have hereunto set my hand this 28th day of January, 1911.

FREDERICK SAMUELSON.

Witnesses:
CHARLES H. FULLER,
J. A. FOSTER.